United States Patent [19]
Staten

[11] Patent Number: 6,012,705
[45] Date of Patent: Jan. 11, 2000

[54] TIRE SPREADING TOOL

[76] Inventor: Gary Staten, 1980 E. 850 South, Hazelton, Id. 83335

[21] Appl. No.: 09/105,438

[22] Filed: Jun. 26, 1998

[51] Int. Cl.[7] .................................................. B60C 25/14
[52] U.S. Cl. ......................... 254/50.1; 29/243; 254/50.4; 254/DIG. 10
[58] Field of Search ................................ 254/50.1, 50.2, 254/50.4, DIG. 10; 29/239, 223, 248, 268; 81/3.7, 318, 321, 322, 323

[56] References Cited

U.S. PATENT DOCUMENTS

| | | | |
|---|---|---|---|
| 1,330,750 | 2/1920 | Stevens | 29/223 |
| 1,463,645 | 7/1923 | Wright | 254/248 |
| 1,776,037 | 9/1930 | Leavitt | 254/50.4 |
| 1,964,602 | 6/1934 | Schumacher | 254/50.1 |
| 2,005,880 | 6/1935 | Anderson | 254/50.1 |
| 2,044,681 | 6/1936 | Griffith | 254/50.1 |
| 2,474,515 | 6/1949 | Cox | 254/50.1 |
| 4,961,742 | 10/1990 | Torre | 81/322 |

*Primary Examiner*—David A. Scherbel
*Assistant Examiner*—Lee Wilson

[57] ABSTRACT

A new tire spreading tool for spreading apart the side walls of a tire on the rim of a wheel, particularly a motorcycle wheel, while removing and installing inner tubes or rim locks. The inventive device includes a pair of elongate arms each having opposite first and second ends, and elongate jaw and handle portions. The jaw portion of each of the arms is positioned adjacent the first end of the arm. The handle portion of each of the arms is positioned adjacent the second end of the arm. The arms are pivotally coupled together at a point between the jaw and handle portions of each of the arms. The jaw portion of each of the arms has a spreading extent outwardly extending from the first end of the associated arm.

18 Claims, 2 Drawing Sheets

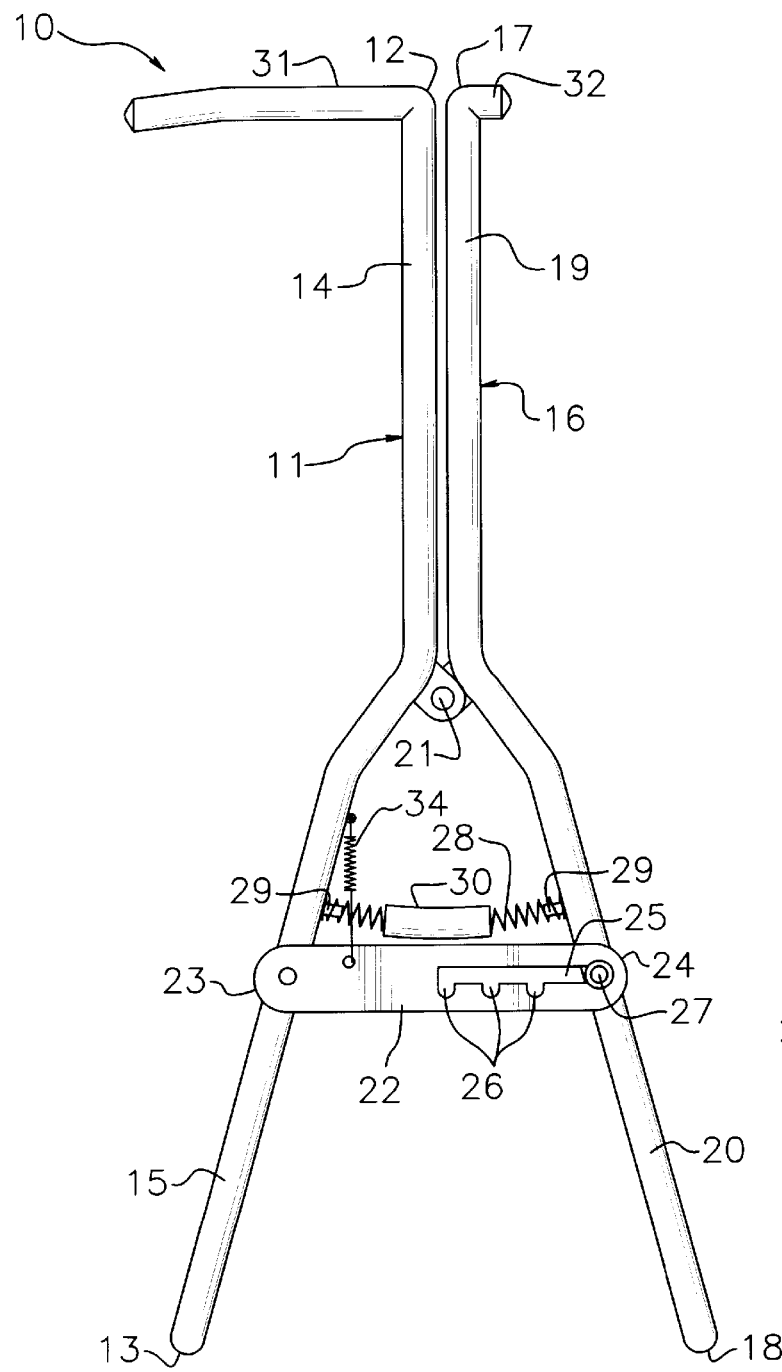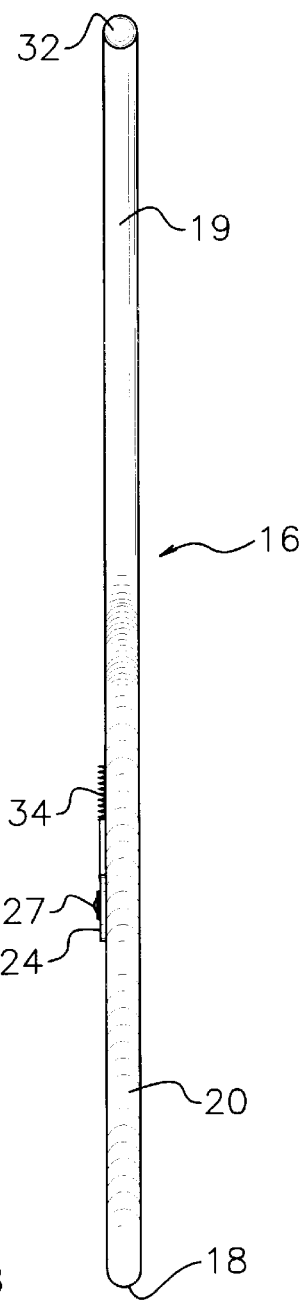

TIRE SPREADING TOOL

BACKGROUND OF THE INVENTION

1. Field of the Invention

The present invention relates to tire removal and mounting tools and more particularly pertains to a new tire spreading tool for spreading apart the side walls of a tire on the rim of a wheel, particularly a motorcycle wheel, while removing and installing inner tubes or rim locks.

2. Description of the Prior Art

The use of tire removal and mounting tools is known in the prior art. More specifically, tire removal and mounting tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art tire removal and mounting tools include U.S. Pat. No. 5,363,897; U.S. Pat. No. 3,931,845; U.S. Pat. No. 3,818,967; U.S. Pat. No. 3,237,676; U.S. Pat. No. 4,947,918; and U.S. Pat. No. 2,189,683.

While these devices fulfill their respective, particular objectives and requirements, the aforementioned patents do not disclose a new tire spreading tool. The inventive device includes a pair of elongate arms each having opposite first and second ends, and elongate jaw and handle portions. The jaw portion of each of the arms is positioned adjacent the first end of the arm. The handle portion of each of the arms is positioned adjacent the second end of the arm. The arms are pivotally coupled together at a point between the jaw and handle portions of each of the arms. The jaw portion of each of the arms has a spreading extent outwardly extending from the first end of the associated arm.

In these respects, the tire spreading tool according to the present invention substantially departs from the conventional concepts and designs of the prior art, and in so doing provides an apparatus primarily developed for the purpose of spreading apart the side walls of a tire on the rim of a wheel while removing and installing inner tubes or rim locks.

SUMMARY OF THE INVENTION

In view of the foregoing disadvantages inherent in the known types of tire removal and mounting tools now present in the prior art, the present invention provides a new tire spreading tool construction wherein the same can be utilized for spreading apart the side walls of a tire on the rim of a wheel while removing and installing inner tubes or rim locks.

The general purpose of the present invention, which will be described subsequently in greater detail, is to provide a new tire spreading tool apparatus and method which has many of the advantages of the tire removal and mounting tools mentioned heretofore and many novel features that result in a new tire spreading tool which is not anticipated, rendered obvious, suggested, or even implied by any of the prior art tire removal and mounting tools, either alone or in any combination there of.

To attain this, the present invention generally comprises a pair of elongate arms each having opposite first and second ends, and elongate jaw and handle portions. The jaw portion of each of the arms is positioned adjacent the first end of the arm. The handle portion of each of the arms is positioned adjacent the second end of the arm. The arms are pivotally coupled together at a point between the jaw and handle portions of each of the arms. The jaw portion of each of the arms has a spreading extent outwardly extending from the first end of the associated arm.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the sever al purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tire spreading tool apparatus and method which has many of the advantages of the tire removal and mounting tools mentioned heretofore and many novel features that result in a new tire spreading tool which is not anticipated, rendered obvious, suggested, or even implied by any of the prior art tire removal and mounting tools, either alone or in any combination thereof.

It is another object of the present invention to provide a new tire spreading tool which may be easily and efficiently manufactured and marketed.

It is a further object of the present invention to provide a new tire spreading tool which is of a durable and reliable construction.

An even further object of the present invention is to provide a new tire spreading tool which is susceptible of a low cost of manufacture with regard to both materials and labor, and which accordingly is then susceptible of low prices of sale to the consuming public, thereby making such tire spreading tool economically available to the buying public.

Still yet another object of the present invention is to provide a new tire spreading tool which provides in the apparatuses and methods of the prior art some of the advantages thereof, while simultaneously overcoming some of the disadvantages normally associated therewith.

Still another object of the present invention is to provide a new tire spreading tool for spreading apart the side walls of a tire on the rim of a wheel while removing and installing inner tubes or rim locks.

Yet another object of the present invention is to provide a new tire spreading tool which includes a pair of elongate arms each having opposite first and second ends, and elongate jaw and handle portions. The jaw portion of each of the arms is positioned adjacent the first end of the arm. The handle portion of each of the arms is positioned adjacent the second end of the arm. The arms are pivotally coupled together at a point between the jaw and handle portions of each of the arms. The jaw portion of each of the arms has a spreading extent outwardly extending from the first end of the associated arm.

Still yet another object of the present invention is to provide a new tire spreading tool that can hold apart the side walls of a tire on the rim of a motorcycle wheel at various distances as desired by the user.

Even still another object of the present invention is to provide a new tire spreading tool that helps prevent injury to the fingers of a user when installing repairing tires on a motorcycle wheel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view of a new tire spreading tool according to the present invention.

FIG. 2 is another schematic side view of the present invention.

DESCRIPTION OF THE PREFERRED EMBODIMENT

Figure 3:
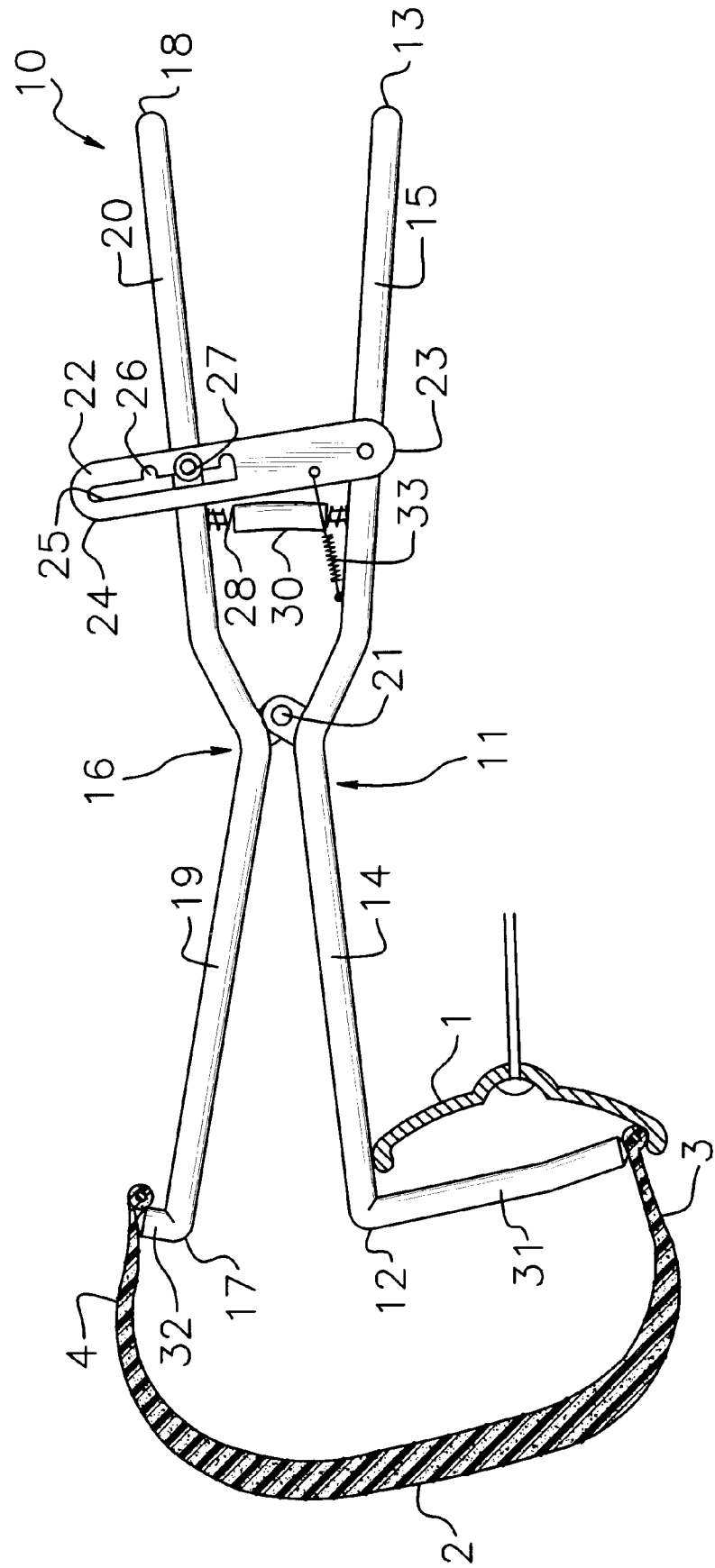
FIG. 3 is a schematic side view of the present invention in sue spreading apart the side walls of a tire on a motorcycle wheel rim.

With reference now to the drawings, and in particular to FIGS. 1 through 3 thereof, a new tire spreading tool embodying the principles and concepts of the present invention and generally designated by the reference numeral 10 will be described.

As best illustrated in FIGS. 1 through 3, the tire spreading tool 10 generally comprises a pair of elongate arms 11,16 each having opposite first and second ends 11,17,12,18, and elongate jaw and handle portions 14,19,15,20. The jaw portion 14,19 of each of the arms 11,16 is positioned adjacent the first end 12,17 of the arm. The handle portion 15,20 of each of the arms 11,16 is positioned adjacent the second end 13,18 of the arm. The arms 11,16 are pivotally coupled together at a point 21 between the jaw and handle portions 14,19,15,20 of each of the arms 11,16. The jaw portion 14,19 of each of the arms 11,16 has a spreading extent 31,32 outwardly extending from the first end 12,17 of the associated arm.

In use, the tire spreading tool 10 is designed for spreading apart the side walls 3,4 of a tire 2 on the rim 1 of a wheel. Specifically, the tool has a pair of elongate arms 11,16 each having opposite first and second ends 11,17,12,18, and elongate jaw and handle portions 14,19,15,20. The jaw portion 14,19 of each of the arms 11,16 is positioned adjacent the first end 12,17 of the arm while the handle portion 15,20 of each of the arms 11,16 is positioned adjacent the second end 13,18 of the arm. The jaw portion 14,19 of each of the arms 11,16 has a longitudinal axis and the handle portion 15,20 of each of the arms 11,16 has a longitudinal axis. The longitudinal axis of each handle portion 15,20 is preferably extended at an obtuse angle from the longitudinal axis of the associated jaw portion 14,19. Ideally, the arms 11,16 comprise metal round stock has a diameter of about ⅜ inch.

The arms 11,16 are pivotally coupled together at a point 21 between the jaw and handle portions 14,19,15,20 of each of the arms 11,16 so that the arms 11,16 are pivotable between a closed position (FIG. 1) and an opened position (FIG. 3). When the arms 11,16 are pivoted towards the closed position, the jaw portions 14,19 of the arms 11,16 are positioned adjacent each other so that they abut each other with the first ends 12,17 of the arms 11,16 positioned adjacent each other. In the closed position, the longitudinal axes of the jaw portions 14,19 of the arms 11,16 are preferably extended generally parallel to each other when the arms 11,16. When in the closed position, the handle portions 15,20 of the arms 11,16 are preferably extend away from each other so that the second ends 13,18 of the arms 11,16 are spaced apart from each other when the arms 11,16 are pivoted towards the closed position. When the arms 11,16 are pivoted towards the opened position, the jaw portions 14,19 of the arms 11,16 are spaced apart from each other (as are the first ends 12,17 of the arms 11,16). When the arms 11,16 are pivoted towards the open position, the handle portions 15,20 of the arms 11,16 are positioned adjacent each other so that they abut each other with the second ends 13,18 of the arms 11,16 positioned adjacent each other. Ideally, the longitudinal axes of the handle portions 15,20 of the arms 11,16 is extended generally parallel to each other when the arms 11,16 are in the open position.

The arms 11,16 are preferably biased towards the closed position. In the preferred embodiment, a return spring 28 biases the arms 11,16 towards the closed position. The return spring 28 is extended between the handle portions 15,20 with each of the ends of the return spring 28 mounted to an adjacent spring retaining pin 29 provided on each of the handle portions 15,20. Preferably, a tubular spring sleeve 30 is disposed around the return spring 28 to protectively cover the return spring 28.

A position locking plate 22 is also provided. The position locking plate has opposite first and second ends 23,24. The first end 23 of the position locking plate 22 is pivotally coupled to the handle portion of the first arm 11. The position locking plate 22 has an elongate slot 25 positioned towards the second end 24 of the position locking plate 22. The slot 25 of the position locking plate 22 has a length extending between the ends 23,24 of the position locking plate 22. The slot 25 of the position locking plate 22 has a plurality of spaced apart notches 26 provided along the length of the slot 25 of the position locking plate 22. The notches 26 are positioned along the length of the slot 25 of the position locking plate 22 preferably towards the first end 23 of the position locking plate 22 with the notches 26 extending on the locking plate 22 in a direction towards the second ends 13,18 of the arms 11,16.

The handle portion 20 of the second arm 16 has a lock pin 27 extending therefrom. The lock pin 27 is inserted into through the slot 25 of the position locking plate 22. In use, the lock pin 27 is slidable along the length of the slot 25 of the position locking plate 22 such that the lock pin 27 is insertable into each of the notches 26. In use, the lock pin 27 holds the jaw portions 14,19 of the arms 11,16 apart at various intervals when the lock pin 27 is inserted into each notch of the slot 25.

Preferably provided on the tool 10 is a position locking spring 33 biasing pivoting of the second end 24 of the position locking plate 22 in a direction towards the first end 17 of the second arm 16. The position locking spring 33 has a pair of opposite ends with one of the ends of the position locking spring 33 coupled to the handle portion of the first arm 11 and the other end of the position locking spring 33 coupled to the position locking plate 22 at a point located towards the first end 23 of the position locking plate 22.

The jaw portion 14,19 of each of the arms 11,16 has a spreading extent 31,32 outwardly extending from the first end 12,17 of the associated arm. Each of the spreading extents 31,32 has a length which is extended generally perpendicular to the longitudinal axis of the associated arm. The lengths of the spreading extents are also extended in generally diametrically opposite directions from each other when the arms 11,16 are in the closed position. Preferably, the spreading extent 31 of the first arm 11 has an angled portion distal the jaw portion of the first arm 11 which is extended at an obtuse angle from the length of the rest of the spreading extent 31 of the first arm 11. Also preferably, the length of the spreading extent 31 of the first arm 11 is greater than the length of the spreading extent 32 of the second arm 16. In a preferred embodiment, the length of the spreading extent 31 of the first arm 11 is at least five times greater than the length of the spreading extent 32 of the second arm 16. In an ideal illustrative embodiment, the length of the spreading extent 31 of the first arm 11 is about 3 inches and the length of the spreading extent 32 of the second arm 16 is about ¼ inch. In use, the spreading extents 31,32 are designed for positioning against the insides of the side walls 3,4 of the tire 2. The jaw portion 14 of the first arm 11 is positioned adjacent one side of the rim 1 of the wheel with the length of the spreading extent 31 of the first arm 11 extending across the width of the rim 1 of the wheel to abut against the inside of far side wall 3 of the tire 2. The spreading extent 32 of the second arm 16 is designed for abutting against the inside of the other side wall 4 of the tire 2 off of the rim 1 of the wheel. As the arms 11,16 are pivoted from the closed position towards the open position, the spreading extents 31,32 spread apart the side walls 3,4 of the tire 2 to create a space between the rim 1 of the wheel and the other side wall 4 off of the rim 1 so that an inner tube may be removed or installed in the inner space between the tire 2 and the rim 1 of the wheel.

In an preferred illustrative embodiment, the length of each of the arms 11,16 defined between the first and second ends 11,17,12,18 of the arm is greater than about 10 inches. Ideally, the length of each of the arms 11,16 is about 14 inches. Ideally, the jaw portion 14,19 of each of the arms 11,16 has a length defined between the first end 12,17 of the arm and the pivot coupling 21 of the arms 11,16. Preferably, the length of the jaw portions 14,19 is greater than about 4 inches. Ideally, the length of each of the jaw portions 14,19 is about 6½ inches. Preferably, the handle portion 15,20 of each of the arms 11,16 has a length defined between the second end 13,18 of the arm and the pivot coupling 21 between the arms 11,1 greater than about 5 inches. Ideally, the length of each handle portion is about 7½ inches. Ideally, the first end 12,17 of the lock plate is spaced apart from the pivot coupling 21 of the arm portions about 3 inches.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tire spreading tool for spreading apart the side walls of a tire on the rim of a wheel, said tool comprising:

a pair of elongate arms each having opposite first and second ends, and elongate jaw and handle portions, said jaw portion of each of said arms being positioned adjacent said first end of said arm, said handle portion of each of said arms being positioned adjacent said second end of said arm;

said arms being pivotally coupled together at a point between said jaw and handle portions of each of said arms;

a position locking plate having opposite first and second ends, said first end of said position locking plate being pivotally coupled to said handle portion of a first arm of said pair of arms, said position locking plate having an elongate slot positioned towards said second end of said position locking plate, said slot of said position locking plate having a length extending between said ends of said position locking plate, said slot of said position locking plate having a plurality of spaced apart notches provided along said length of said slot of said position locking plate, said notches being positioned along said length of said slot of said position locking plate towards first end of said position locking plate, said handle portion of a second arm of said pair of arms having a lock pin extending therefrom, said lock pin being inserted into said slot of said position locking plate, said lock pin being slidable along said length of said slot of said position locking plate such that said lock pin is insertable into each of said notches of said slot of said position locking plate; and said jaw portion of each of said arms having a spreading extent outwardly extending from said first end of the associated arm.

2. The tool of claim 1, wherein said arms are pivotable between a closed position and an opened position, wherein said jaw portions of said arms are positioned adjacent each other when said arms are pivoted towards said closed position, wherein said jaw portions of said arms are spaced apart from each other when said arms are pivoted towards said opened position, wherein said handle portions of said arms are extend away from each other when said arms are pivoted towards said closed position, wherein said handle portions of said arms are positioned adjacent each other when said arms are pivoted towards said open position.

3. The tool of claim 2, wherein said jaw portion of each of said arms has a longitudinal axis, wherein said handle portion of each of said arms has a longitudinal axis, wherein said longitudinal axis of each handle portion being extended at an obtuse angle from said longitudinal axis of the associated jaw portion.

4. The tool of claim 3, wherein said longitudinal axes of said jaw portions of said arms are extended generally parallel to each other when said arms are in said closed position, and wherein said longitudinal axes of said handle portions of said arms are extended generally parallel to each other when said arms are in said open position.

5. The tool of claim 2, wherein said arms are biased by a spring towards said closed position.

6. The tool of claim 5, wherein a return spring biases said arms towards said closed position, said return spring being extended between said handle portions.

7. The tool of claim 1, wherein each of said spreading extents has a length, said lengths of said spreading extents being extended generally perpendicular to said longitudinal axis of the associated arm.

8. The tool of claim 7, wherein said length of said spreading extent of said first arm is greater than said length of said spreading extent of said second arm.

9. The tool of claim 7, wherein said length of said spreading extent of said first arm is at least five times greater than said length of said spreading extent of said second arm.

10. The tool of claim 7, wherein said length of said spreading extent of said first arm is about 3 inches and said length of said spreading extent of said second arm is about ¼ inch.

11. A tire spreading tool for spreading apart the side walls of a tire on the rim of a wheel, said tool comprising:
a pair of elongate arms each having opposite first and second ends, and elongate jaw and handle portions, said jaw portion of each of said arms being positioned adjacent said first end of said arm, said handle portion of each of said arms being positioned adjacent said second end of said arm;
said jaw portion of each of said arms having a longitudinal axis;
said handle portion of each of said arms having a longitudinal axis;
said longitudinal axis of each handle portion being extended at an obtuse angle from said longitudinal axis of the associated jaw portion;
said arms being pivotally coupled together at a point between said jaw and handle portions of each of said arms, said arms being pivotable between a closed position and an opened position;
wherein said jaw portions of said arms are positioned adjacent each other when said arms are pivoted towards said closed position;
said longitudinal axes of said jaw portions of said arms being extended generally parallel to each other when said arms are in said closed position;
wherein said jaw portions of said arms are spaced apart from each other when said arms arc pivoted towards said opened position;
wherein said handle portions of said arms are extend away from each other when said arms are pivoted towards said closed position;
wherein said handle portions of said arms are positioned adjacent each other when said arms are pivoted towards said open position;
said longitudinal axes of said handle portions of said arms being extended generally parallel to each other when said arms are in said open position;
said arms being biased towards said closed position, wherein a return spring biases said arms towards said closed position, said return spring being extended between said handle portions;
a position locking plate having opposite first and second ends, said first end of said position locking plate being pivotally coupled to said handle portion of a first arm of said pair of arms;
said position locking plate having an elongate slot positioned towards said second end of said position locking plate, said slot of said position locking plate having a length extending between said ends of said position locking plate, said slot of said position locking plate having a plurality of spaced apart notches provided along said length of said slot of said position locking plate, said notches being positioned along said length of said slot of said position locking plate towards first end of said position locking plate;
said handle portion of a second arm of said pair of arms having a lock pin extending therefrom, said lock pin being inserted into said slot of said position locking plate, said lock pin being slidable along said length of said slot of said position locking plate such that said lock pin is insertable into each of said notches of said slot of said position locking plate;
said jaw portion of each of said arms having a spreading extent outwardly extending from said first end of the associated arm, each of said spreading extents having a length, said lengths of said spreading extents being extended generally perpendicular to said longitudinal axis of the associated arm, said lengths of said spreading extents being extended in generally diametrically opposite directions when said arms are in said closed position; and
wherein said length of said spreading extent of said first arm is about 3 inches and said length of said spreading extent of said second arm is about ¼ inch.

12. A tire spreading tool for spreading apart the side walls of a tire on the rim of a wheel, said tool comprising:
a pair of elongate arms each having opposite first and second ends, and elongate jaw and handle portions, said jaw portion of each of said arms being positioned adjacent said first end of said arm, said handle portion of each of said arms being positioned adjacent said second end of said arm;
said arms being pivotally coupled together at a point between said jaw and handle portions of each of said arms; and
said jaw portion of each of said arms having a spreading extent outwardly extending from said first end of the associated arm, said spreading extents having a length, said lengths of said spreading extents being extended generally perpendicular to said longitudinal axis of the associated arm, said length of said spreading extent of said first arm is at least five times greater than said length of said spreading extent of said second arm.

13. The tool of claim 12, wherein said arms are pivotable between a closed position and an opened position, wherein said jaw portions of said arms are positioned adjacent each other when said arms are pivoted towards said closed position, wherein said jaw portions of said arms are spaced apart from each other when said arms are pivoted towards said opened position, wherein said handle portions of said arms are extend away from each other when said arms are pivoted towards said closed position, wherein said handle portions of said arms are positioned adjacent each other when said arms are pivoted towards said open position.

14. The tool of claim 13, wherein said jaw portion of each of said arms has a longitudinal axis, wherein said handle portion of each of said arms has a longitudinal axis, wherein said longitudinal axis of each handle portion being extended at an obtuse angle from said longitudinal axis of the associated jaw portion.

15. The tool of claim 14, wherein said longitudinal axes of said jaw portions of said arms are extended generally parallel to each other when said arms are in said closed position, and wherein said longitudinal axes of said handle portions of said arms are extended generally parallel to each other when said arms are in said open position.

16. The tool of claim 13, wherein said arms are biased by a spring towards said closed position.

17. The tool of claim 16, wherein a return spring biases said arms towards said closed position, said return spring being extended between said handle portions.

18. The tool of claim 12, wherein said length of said spreading extent of said first arm is about 3 inches and said length of said spreading extent of said second arm is about ¼ inch.

* * * * *